United States Patent
Chengalva

(10) Patent No.: US 10,086,947 B2
(45) Date of Patent: Oct. 2, 2018

(54) SYSTEM AND METHOD OF SUPPRESSING AN UNEXPECTED COMBUSTION EVENT

(71) Applicant: The Boeing Company, Chicago, IL (US)

(72) Inventor: Mahesh Krishna Chengalva, Bothell, WA (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 15/133,440

(22) Filed: Apr. 20, 2016

(65) Prior Publication Data
US 2017/0305562 A1    Oct. 26, 2017

(51) Int. Cl.
B64D 25/00    (2006.01)
B64C 1/14    (2006.01)
B64C 1/20    (2006.01)

(52) U.S. Cl.
CPC ........... B64D 25/00 (2013.01); B64C 1/1407 (2013.01); B64C 1/20 (2013.01)

(58) Field of Classification Search
CPC .......... B64D 25/00; B64C 1/20; B64C 1/1407
See application file for complete search history.

(56) References Cited

U.S. PATENT DOCUMENTS

| | | | | |
|---|---|---|---|---|
| 5,540,402 A | * | 7/1996 | Carducci | B64D 9/00 244/118.1 |
| 5,577,740 A | * | 11/1996 | Purdom | F16K 17/383 220/201 |
| 6,003,608 A | * | 12/1999 | Cunningham | A62C 3/08 169/46 |
| 6,435,455 B1 | * | 8/2002 | Holman | B64C 1/10 244/118.5 |
| 9,340,294 B1 | * | 5/2016 | Keleher | B64C 1/1407 |
| 2003/0168553 A1 | * | 9/2003 | Diehl | B64C 1/18 244/129.1 |
| 2011/0112660 A1 | * | 5/2011 | Bergmann | G08B 7/066 700/29 |
| 2013/0327548 A1 | * | 12/2013 | Cailly | A62C 3/07 169/43 |
| 2015/0031277 A1 | * | 1/2015 | Khera | B64C 1/14 454/76 |

FOREIGN PATENT DOCUMENTS

EP    2574553 A1    4/2013

OTHER PUBLICATIONS

EPO Extended Search Report for related application 17159581.1 dated May 26, 2017; 7 pp.

* cited by examiner

*Primary Examiner* — Justin M Benedik
(74) *Attorney, Agent, or Firm* — Armstrong Teasdale LLP

(57) ABSTRACT

An aircraft that includes an outer skin having an opening formed therein, and a cargo compartment including a plurality of side walls that define an interior of the cargo compartment. The plurality of side walls are positioned such that the interior is in flow communication with the opening. The aircraft further includes a hinged panel coupled to the outer skin. The hinged panel is operable between a closed position for covering the opening and an open position for exposing the interior to an ambient environment outside the aircraft. A release device is configured to retain the hinged panel in the closed position, and configured to release the hinged panel for movement into the open position when an unexpected combustion event forms in the interior.

20 Claims, 6 Drawing Sheets

SYSTEM AND METHOD OF SUPPRESSING AN UNEXPECTED COMBUSTION EVENT

BACKGROUND

The field of the present disclosure relates generally to aircraft assemblies and, more specifically, to a system and method of suppressing an unexpected combustion event in a cargo compartment of a vehicle, such as an aircraft, a train, or a semi-trailer truck.

At least some known large commercial aircraft are operated as passenger carrying vehicles, cargo carrying vehicles, or some combination thereof. More specifically, some aircraft include luggage or cargo compartments located in the lower decks of the aircraft. The luggage or cargo compartments typically include fire detection and fire suppression systems for use in the unlikely event of a combustion event forming in the compartments. For example, the fire suppression system can take the form of a sprinkler or Halon system for extinguishing the combustion event before it spreads to the rest of the aircraft. However, transporting new and popular technology capable of a powerful and combustible malfunction, such as lithium ion batteries, creates a potential hazard even when all safety precautions are executed.

BRIEF DESCRIPTION

In one aspect, an aircraft is provided. The aircraft includes an outer skin having an opening formed therein, and a cargo compartment including a plurality of side walls that define an interior of the cargo compartment. The plurality of side walls are positioned such that the interior is in flow communication with the opening. The aircraft further includes a hinged panel coupled to the outer skin. The hinged panel is operable between a closed position for covering the opening and an open position for exposing the interior to an ambient environment outside the aircraft. A release device is configured to retain the hinged panel in the closed position, and configured to release the hinged panel for movement into the open position when an unexpected combustion event forms in the interior.

In another aspect, a method of suppressing an unexpected combustion event within a cargo compartment of an aircraft is provided. The method includes sealing an interior of the cargo compartment with a hinged panel in a closed position. The hinged panel is selectively operable between the closed position and an open position. The method further includes releasing the hinged panel for movement into the open position when a temperature within the interior of the cargo compartment is greater than a threshold. The hinged panel is released such that the interior is exposed to an ambient environment outside the aircraft, and such that products of the unexpected combustion event are vented to the ambient environment.

In yet another aspect, a method of assembling an aircraft is provided. The method includes forming an opening in an outer skin of the aircraft, coupling an interior of a cargo compartment in flow communication with the opening, and coupling a hinged panel to the outer skin. The hinged panel is operable between a closed position for covering the opening and an open position for exposing the interior to an ambient environment outside the aircraft. The method further includes coupling a release device between the outer skin and the hinged panel. The release device is configured to retain the hinged panel in the closed position, and configured to release the hinged panel for movement into the open position when an unexpected combustion event forms in the interior.

DETAILED DESCRIPTION

The implementations described herein relate to a system and method of suppressing an unexpected combustion event in a cargo compartment of an aircraft. More specifically, the cargo compartment includes an interior in flow communication with an opening formed in an outer skin of the aircraft. The opening is covered with a hinged panel that is operable between a closed position when covering the opening and an open position for exposing the interior to an ambient environment outside the aircraft. For example, the hinged panel is released for movement into the open position when the unexpected combustion event forms in the cargo compartment, thereby increasing the temperature within the interior. More specifically, the increased temperature causes a temperature-sensitive release device to release the hinged panel from the closed position. Exposing the interior to the ambient environment allows products of the unexpected combustion event to vent to the ambient environment, and allows airflow from the ambient environment to enter the interior for suppressing the unexpected combustion event. As such, rather than attempting to contain the unexpected combustion event within the aircraft, the decompression event causes the unexpected combustion event to be suppressed rapidly with a powerful and continuous airflow.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
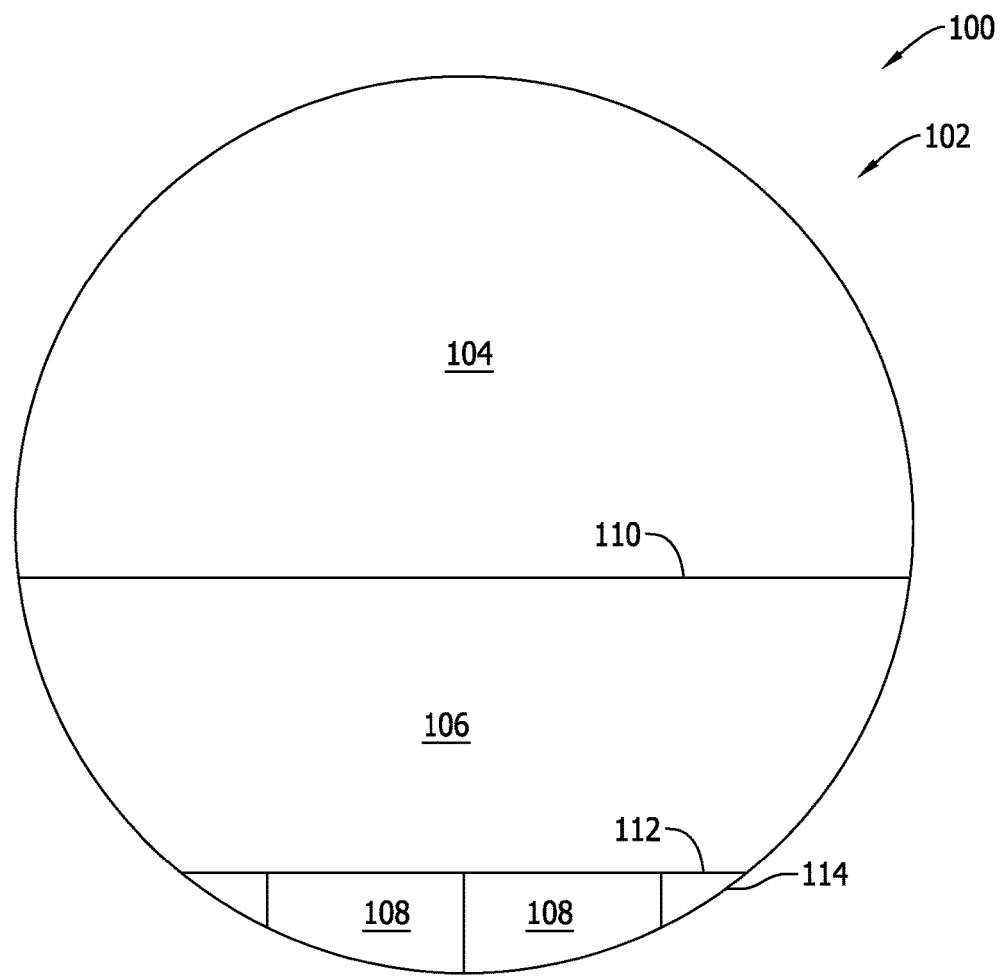
FIG. 1 is a cross-sectional illustration of an exemplary aircraft fuselage.

FIG. 1 is a cross-sectional illustration of an exemplary aircraft 100 including a fuselage 102. In the exemplary implementation, fuselage 102 includes a passenger compartment 104, a cargo deck 106, and a plurality of cargo compartments 108 located beneath cargo deck 106. Passenger compartment 104 and cargo deck 106 are separated by a first floor 110, and cargo deck 106 and the plurality of cargo compartments 108 are separated by a second floor 112. Fuselage 102 also includes an outer skin 114 extending about passenger compartment 104, cargo deck 106, and cargo compartments 108. In addition, while shown as located beneath second floor 112, such as cargo compartments located in an aft section of an aircraft, cargo compartments 108 may have any shape and be located anywhere in aircraft 100 that enables the systems and methods to function as described herein.

Figure 2:
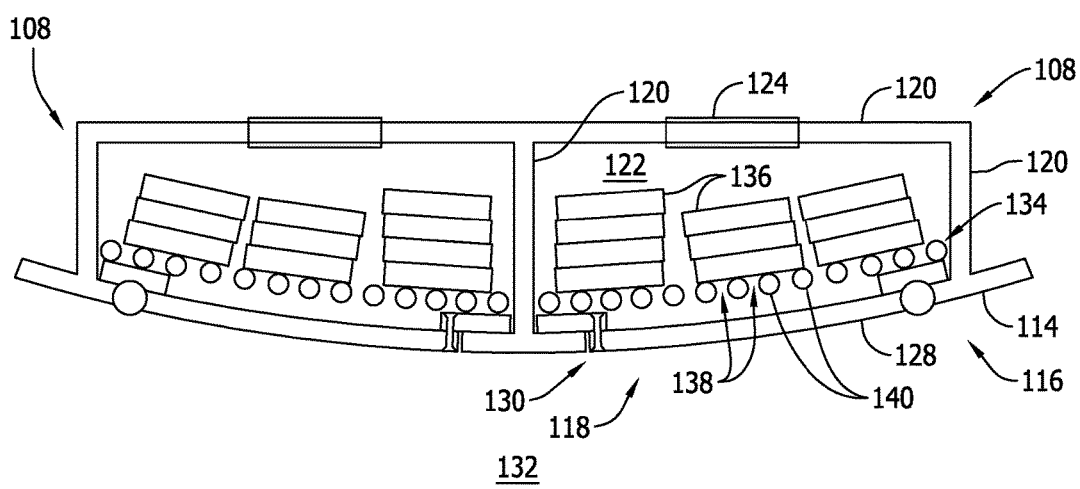
FIG. 2 is a schematic illustration of an exemplary cargo compartment and fire suppression assembly that may be used in the fuselage shown in FIG. 1.

FIG. 2 is a schematic illustration of an exemplary cargo compartment 108 and fire suppression assembly 116 that may be used in fuselage 102 (shown in FIG. 1). In the exemplary implementation, outer skin 114 of fuselage 102 has an opening 118 formed therein, and cargo compartment 108 includes a plurality of side walls 120 that define an interior 122 of cargo compartment 108. The plurality of side walls 120 are coupled to outer skin 114, and are positioned such that interior 122 is in flow communication with opening 118. The plurality of side walls 120 are also at least partially formed from fire-resistant material. As such, cargo compartment 108 is capable of limiting the spread of an unexpected combustion event to the remainder of aircraft 100 (shown in FIG. 1). In addition, cargo compartment 108 includes an access panel 124, which provides access to interior 122 from cargo deck 106 (shown in FIG. 1), for example.

In the exemplary implementation, fire suppression assembly 116 includes a hinged panel 128 coupled, either directly or indirectly, to outer skin 114, and a release device 130. Hinged panel 128 is operable between a closed position for covering opening 118 and an open position for exposing interior 122 to an ambient environment 132 outside aircraft 100. As will be described in more detail below, release device 130 retains hinged panel 128 in the closed position when aircraft 100 is operating normally, and releases hinged panel 128 for movement into the open position when an unexpected combustion event forms in interior 122. As such, when aircraft 100 is in flight, airflow is channeled into interior 122 of cargo compartment 108 from ambient environment 132 to facilitate suppressing the unexpected combustion event.

Moreover, a porous support structure 134 is coupled within cargo compartment 108. Porous support structure 134 is positioned within cargo compartment 108 such that cargo 136 within cargo compartment 108 is restricted from falling through opening 118 when hinged panel 128 is in the open position. More specifically, porous support structure 134 extends across opening 118 such that cargo 136 is positioned directly over opening 118. Moreover, porous support structure 134 is designed such that a plurality of through holes 138 defined therein are sized to permit airflow therethrough. For example, in one implementation, each through hole 138 has an open cross-sectional area of at least about 2.0 square inches (12.9 square centimeters). As such, when hinged panel 128 is in the open position, through holes 138 enable airflow to reach combusted cargo in a more direct manner.

Porous support structure 134 is fabricated from any material and takes any form that enables the systems and methods to function as described herein. As shown, porous support structure 134 is formed from a network of rods 140 arranged in a crosswise pattern, thereby defining through holes 138. Moreover, rods 140 are formed from material capable of withstanding a high-temperature combustion event of at least about 1832° F. (1000° C.). An exemplary temperature-resistant material includes, but is not limited to, a steel material.

Figure 3:
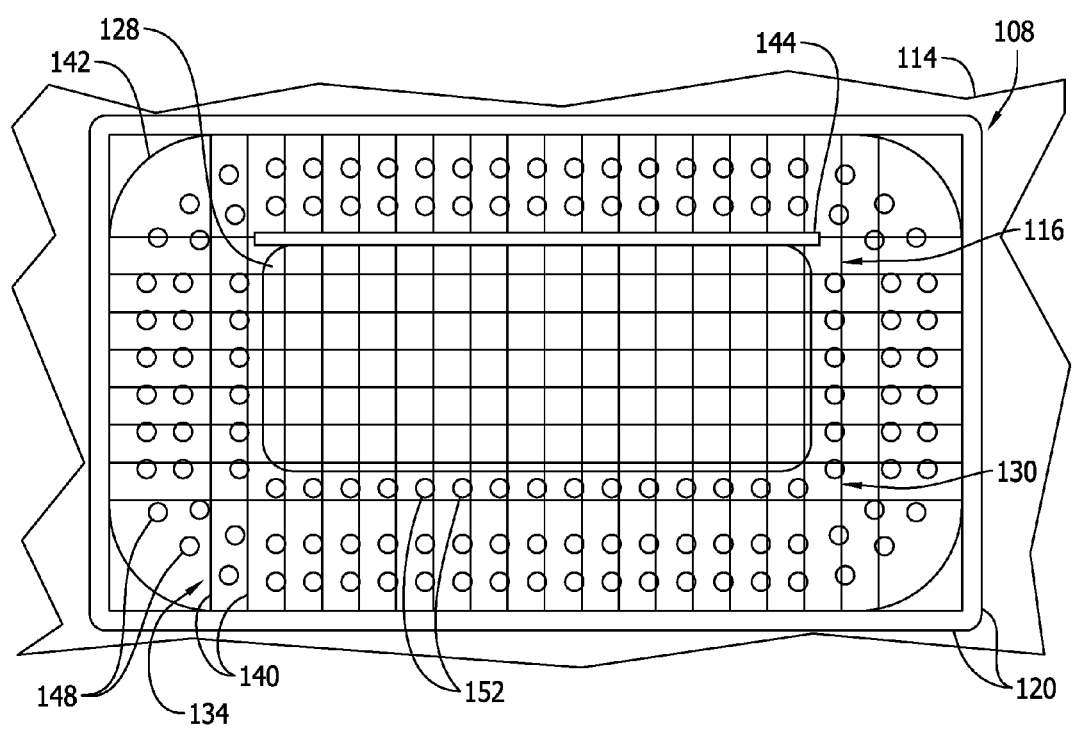
FIG. 3 is a schematic internal view of the fire suppression assembly from inside the aircraft shown in FIG. 1.
Figure 4:
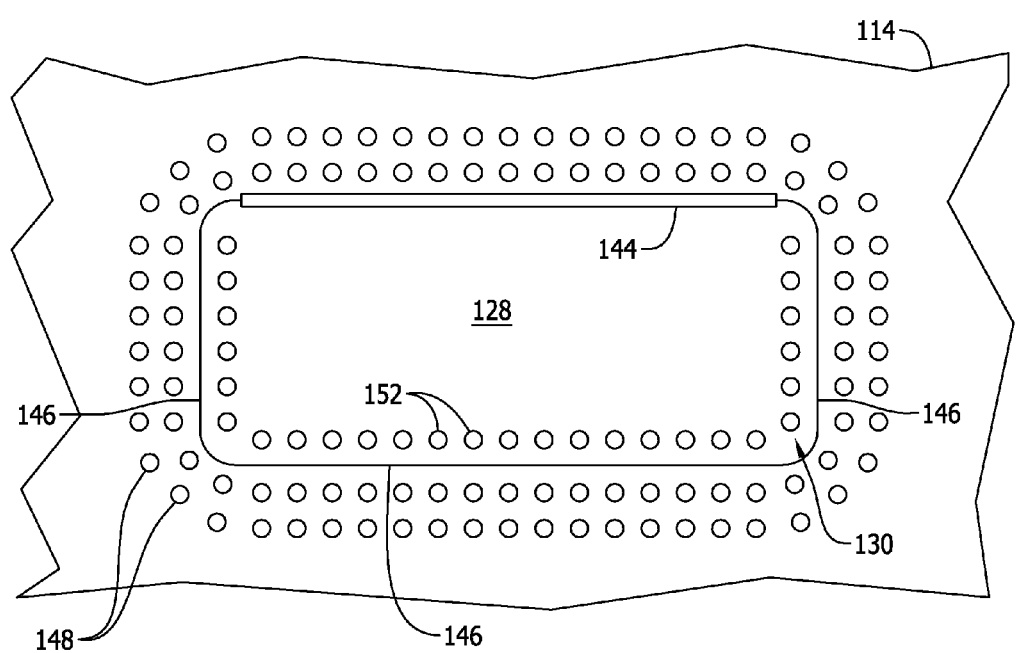
FIG. 4 is a schematic external view of the fire suppression assembly from outside the aircraft shown in FIG. 1.

FIG. 3 is a schematic internal view of fire suppression assembly 116 from inside aircraft 100 (shown in FIG. 1), and FIG. 4 is a schematic external view of fire suppression assembly 116 from outside aircraft 100. Referring to FIG. 3, in the exemplary implementation, fire suppression assembly 116 further includes a splice plate 142 coupled within cargo compartment 108 and extending about a periphery of opening 118 (not shown in FIG. 3) in outer skin 114. Splice plate 142 is positioned to facilitate coupling hinged panel 128 to outer skin 114 for retention in the closed position. More specifically, splice plate 142 is coupled to outer skin 114 and hinged panel 128 is coupled to splice plate 142. For example, hinged panel 128 includes a hinge 144 coupled to splice plate 142 and a plurality of free edges 146. As will be described in more detail below, free edges 146 are coupled to splice plate 142 with release device 130 to facilitate retaining hinged panel 128 in the closed position.

Moreover, splice plate 142 is coupled to outer skin 114 with a plurality of fasteners 148 formed from temperature-resistant material, such as the temperature-resistant material used to form rods 140. As such, fasteners 148 are capable of withstanding a high-temperature combustion event for ensuring splice plate 142 remains coupled to outer skin 114 during the combustion event.

In an alternative implementation, fire suppression assembly 116 includes one or more smaller sized hinged panels than hinged panel 128. Reducing the size of the hinged panels facilitates increasing the ground surface area within cargo compartment 108 such that cargo 136 (shown in FIG. 2) can be loaded directly thereon without the use of a highly reinforced porous support structure. As such, cargo 136 is restricted from falling through opening 118 with an alternative lightweight means, thereby reducing the overall weight of aircraft 100.

Figure 5:
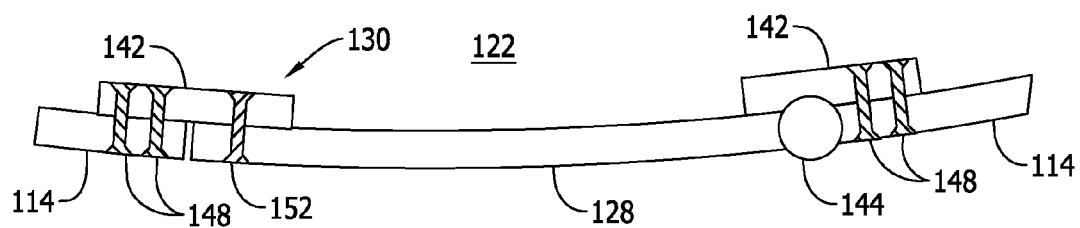
FIG. 5 is a schematic illustration of an exemplary release device that may be used with the fire suppression assembly shown in FIG. 2.
Figure 6:
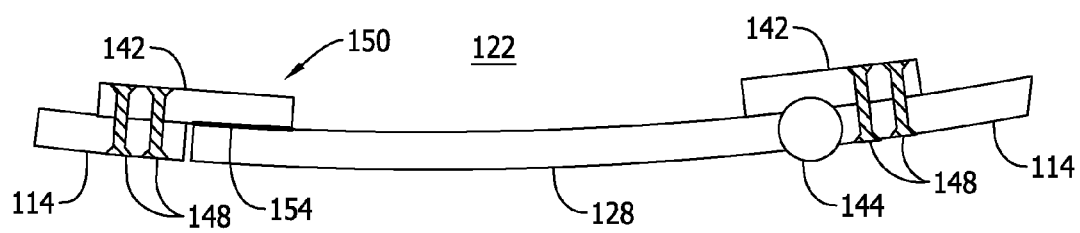
FIG. 6 is a schematic illustration of an alternative release device that may be used with the fire suppression assembly shown in FIG. 2.

FIG. 5 is a schematic illustration of an exemplary release device 130 that may be used with fire suppression assembly 116, and FIG. 6 is a schematic illustration of an alternative release device 150 that may be used with fire suppression assembly 116. In the exemplary implementation, release device 130 is coupled between hinged panel 128 and splice plate 142. As described above, release device 130 retains hinged panel 128 in the closed position when aircraft 100 (shown in FIG. 1) is operating normally, and releases hinged panel 128 for movement into the open position when an unexpected combustion event forms in interior 122. Release devices 130 and 150 are fabricated from temperature-material having a melting point such that hinged panel 128 is automatically released from the closed position when a temperature within interior 122 is greater than the melting point. More specifically, hinged panel 128 is automatically released upon failure of release device 130 or 150 due to excessive heating caused by the unexpected combustion event.

Referring to FIG. 5, release device 130 is a fastener 152 fabricated from temperature-sensitive material. More specifically, fastener 152 has a double countersunk design, and extends through hinged panel 128 and splice plate 142 for retaining hinged panel 128 in the closed position. Referring to FIG. 6, release device 150 is a layer 154 of adhesive fabricated from temperature-sensitive material. More specifically, layer 154 of adhesive extends between hinged panel 128 and splice plate 142 for retaining hinged panel 128 in the closed position. In an alternative implementation, hinged panel 128 is retained in the closed position with an actuatable mechanical latch, which is actuatable in response to temperature feedback from a sensor positioned within interior 122.

Fastener 152 and layer 154 of adhesive may be fabricated from any temperature-sensitive material that enables release devices 130 and 150 to function as described herein. As used herein, "temperature-resistant" and "temperature-sensitive"

are relative terms used to generally describe the melting point of a certain material. For example, the plurality of fasteners 148 used couple splice plate 142 to outer skin 114 are fabricated from temperature-resistant material having a higher melting point than the temperature-sensitive material used to fabricate release devices 130 and 150. As such, as used herein, temperature-resistant material has a higher melting point that temperature-sensitive material. In one implementation, the melting point of the temperature-sensitive material is defined within a range between about 350° F. (176.7° C.) and about 600° F. (315.6° C.).

An exemplary material used to fabricate fastener 152 includes, but is not limited to, a polytetrafluoroethylene material. An exemplary material used to fabricate layer 154 of adhesive includes, but is not limited to, high-temperature epoxy adhesives, such as those produced by MasterBond, Cotronics Corporation, and Armeco Corporation. Moreover, the size of fasteners 152 is selected based on a number of factors, such as size of interior 122, a maximum weight of cargo 136 to be stored within interior 122, the number of fasteners 152 used to retain hinged panel 128 in the closed position, and the tensile strength of fasteners 152.

Figure 7:
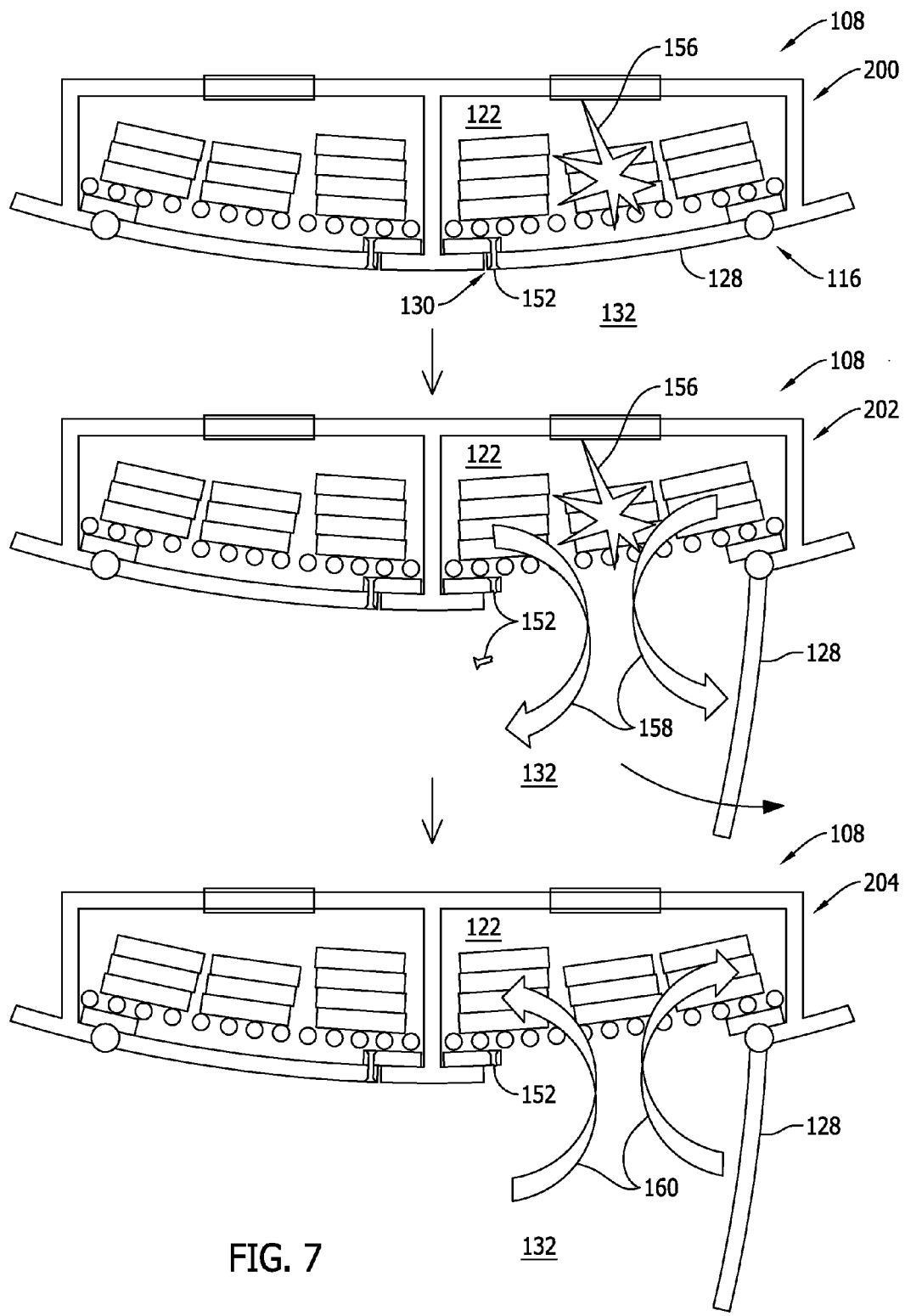
FIG. 7 is a flow diagram depicting an exemplary sequence for suppressing an unexpected combustion event.

FIG. 7 is a flow diagram depicting an exemplary sequence for suppressing an unexpected combustion event 156, including a first sequential diagram 200, a second sequential diagram 202, and a third sequential diagram 204. In the exemplary implementation, fire suppression assembly 116 is initially in a non-activated state in which interior 122 of cargo compartment 108 is sealed with hinged panel 128 in the closed position. As shown in first sequential diagram 200, unexpected combustion event 156 forms in interior 122, which causes the temperature and pressure within interior 122 to increase. Fire detection systems (not shown) within cargo compartment 108 notify the cockpit crew of an occurrence of unexpected combustion event 156, but the remainder of the sequence occurs automatically (i.e., without intervention from the cockpit crew).

As shown in second sequential diagram 202, the increased temperature within interior 122 causes release device 130 to fail, which releases hinged panel 128 from the closed position. More specifically, the increased pressure within interior 122 caused by unexpected combustion event 156 facilitates creating a pressure differential between interior 122 of cargo compartment 108 and ambient environment 132. The pressure differential facilitates inducing hinged panel 128 to swing into the open position, thereby depressurizing cargo compartment 108 while the remainder of aircraft 100 (shown in FIG. 1) remains pressurized. Products of unexpected combustion event 156, such as heat and smoke 158, are then immediately vented to ambient environment 132.

As shown in third sequential diagram 204, hinged panel 128 is in the open position, which allows airflow 160 to enter interior 122 of cargo compartment 108. More specifically, in one implementation, aircraft 100 is operating at a speed such that turbulent airflow 160 is channeled into interior 122 for rapidly cooling interior 122. As such, unexpected combustion event 156 is suppressed by airflow 160 and contained within cargo compartment 108.

A method of suppressing an unexpected combustion event within cargo compartment 108 of aircraft 100 is described herein. The method includes sealing interior 122 of cargo compartment 108 with hinged panel 128 in a closed position. The hinged panel is selectively operable between the closed position and an open position. The method also includes releasing hinged panel 128 for movement into the open position when a temperature within interior 122 of cargo compartment 108 is greater than a threshold. The hinged panel 128 is released such that interior 122 is exposed to ambient environment 132 outside the aircraft 100, and such that products of the unexpected combustion event are vented to ambient environment 132.

The method further includes operating aircraft 100 at a speed such that airflow 160 is channeled into interior 122 of cargo compartment 108 from ambient environment 132. Moreover, releasing hinged panel 128 includes retaining hinged panel 128 in the closed position with release device 130 fabricated from temperature-sensitive material, and automatically releasing hinged panel 128 when the temperature within interior 122 of cargo compartment 108 is greater than a melting point of the temperature-sensitive material. In addition, sealing interior 122 of cargo compartment 108 includes creating a pressure differential between interior 122 of cargo compartment 108 and ambient environment 132, the pressure differential for inducing hinged panel 128 to swing into the open position.

The method further includes restricting cargo 136 from falling through opening 118 vacated by hinged panel 128 with porous support structure 134. The porous support structure 134 includes a plurality of through holes 138 defined therein sized to permit airflow therethrough.

A method of assembling aircraft 100 is also described herein. The method includes forming opening 118 in outer skin 114 of aircraft 100, coupling interior 122 of cargo compartment 108 in flow communication with opening 118, and coupling hinged panel 128 to outer skin 114. The hinged panel 128 is operable between a closed position for covering opening 118 and an open position for exposing interior 122 to ambient environment 132 outside aircraft 100. The method further includes coupling release device 130 between outer skin 114 and hinged panel 128, release device 130 configured to retain hinged panel 128 in the closed position, and configured to release hinged panel 128 for movement into the open position when an unexpected combustion event forms in interior 122.

The method further includes coupling porous support structure 134 within cargo compartment 108, the porous support structure 134 configured to restrict cargo 136 from falling through opening 118 when hinged panel 128 is in the open position. In addition, the method includes fabricating release device 130 from temperature-sensitive material having a melting point such that hinged panel 128 is released when a temperature within interior 122 is greater than the melting point.

In one implementation, coupling release device 130 includes coupling at least one of fastener 152 or layer 154 of adhesive between outer skin 114 and hinged panel 128. Moreover, coupling release device 130 includes coupling splice plate 142 within cargo compartment 108, the splice plate 142 extending about a periphery of opening 118 in outer skin 114, and coupling release device 130 between hinged panel 128 and splice plate 142.

An exemplary technical effect of the system and methods described herein includes at least one of: (a) rapidly suppressing an unexpected combustion event; (b) providing a device for automatically suppressing the unexpected combustion event without human intervention; and (c) increasing the effectiveness and overall safety provided by fire suppression and containment systems onboard aircraft.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft comprising:
    an outer skin having an opening formed therein;
    a cargo compartment comprising a plurality of side walls that define an interior of said cargo compartment, said plurality of side walls positioned such that said interior is in flow communication with said opening;
    a hinged panel coupled to said outer skin, said hinged panel operable between a closed position for covering said opening and an open position for exposing said interior to an ambient environment outside the aircraft; and
    a release device configured to retain said hinged panel in the closed position, and configured to automatically release said hinged panel for movement into the open position when an unexpected combustion event forms in said interior and when a temperature within said interior is greater than a threshold.

2. The aircraft in accordance with claim 1, wherein said plurality of side walls are at least partially formed from fire-resistant material.

3. The aircraft in accordance with claim 1 further comprising a porous support structure coupled within said cargo compartment, said porous support structure configured to restrict cargo from falling through said opening when said hinged panel is in the open position.

4. The aircraft in accordance with claim 3, wherein said porous support structure extends across said opening such that the cargo is positioned directly over said opening.

5. The aircraft in accordance with claim 3, wherein said porous support structure comprises a plurality of through holes defined therein sized to permit airflow therethrough.

6. The aircraft in accordance with claim 1, wherein said release device is fabricated from temperature-sensitive material having a melting point, wherein said release device is configured to fail when a temperature within said interior is greater than the melting point such that said hinged panel is automatically released.

7. The aircraft in accordance with claim 6, wherein the melting point of the temperature-sensitive material is defined within a range between about 350° F. (176.7° C.) and about 600° F. (315.6° C.).

8. The aircraft in accordance with claim 1, wherein said release device comprises at least one of a fastener or a layer of adhesive.

9. The aircraft in accordance with claim 1 further comprising a splice plate coupled within said cargo compartment and extending about a periphery of said opening in said outer skin, wherein said release device is coupled between said hinged panel and said splice plate.

10. The aircraft in accordance with claim 9, wherein said splice plate is coupled to said outer skin with a plurality of fasteners fabricated from material having a higher melting point than material used to fabricate said release device.

11. A method of suppressing an unexpected combustion event within a cargo compartment of an aircraft, said method comprising:
    sealing an interior of the cargo compartment with a hinged panel in a closed position, the hinged panel selectively operable between the closed position and an open position; and
    automatically releasing the hinged panel for movement into the open position when a temperature within the interior of the cargo compartment is greater than a threshold, the hinged panel released such that the interior is exposed to an ambient environment outside the aircraft, and such that products of the unexpected combustion event are vented to the ambient environment.

12. The method in accordance with claim 11 further comprising operating the aircraft at a speed such that airflow is channeled into the interior of the cargo compartment from the ambient environment.

13. The method in accordance with claim 11, wherein releasing the hinged panel comprises:
    retaining the hinged panel in the closed position with a release device fabricated from temperature-sensitive material; and
    automatically releasing the hinged panel when the temperature within the interior of the cargo compartment is greater than a melting point of the temperature-sensitive material.

14. The method in accordance with claim 13, wherein sealing an interior of the cargo compartment comprises creating a pressure differential between the interior of the cargo compartment and the ambient environment, the pressure differential for inducing the hinged panel to swing into the open position.

15. The method in accordance with claim 11 further comprising restricting cargo from falling through an opening vacated by the hinged panel with a porous support structure, wherein the porous support structure includes a plurality of through holes defined therein sized to permit airflow therethrough.

16. A method of assembling an aircraft, said method comprising:
    forming an opening in an outer skin of the aircraft;
    coupling an interior of a cargo compartment in flow communication with the opening;
    coupling a hinged panel to the outer skin, wherein the hinged panel is operable between a closed position for covering the opening and an open position for exposing the interior to an ambient environment outside the aircraft; and
    coupling a release device between the outer skin and the hinged panel, the release device configured to retain the hinged panel in the closed position, and configured to automatically release the hinged panel for movement into the open position when an unexpected combustion event forms in the interior and when a temperature within said interior is greater than a threshold.

17. The method in accordance with claim 16 further comprising coupling a porous support structure within the cargo compartment, the porous support structure configured to restrict cargo from falling through the opening when the hinged panel is in the open position.

18. The method in accordance with claim 16 further comprising fabricating the release device from temperature-sensitive material having a melting point, wherein the release device is configured to fail when a temperature within the interior is greater than the melting point such that said hinged panel is automatically released.

19. The method in accordance with claim 16, wherein coupling a release device comprises coupling at least one of a fastener or a layer of adhesive between the outer skin and the hinged panel.

20. The method in accordance with claim 16, wherein coupling a release device comprises:
   coupling a splice plate within the cargo compartment, the splice plate extending about a periphery of the opening in the outer skin; and
   coupling the release device between the hinged panel and the splice plate.

* * * * *